April 24, 1928. 1,667,250
W. ENSDORF ET AL
ELECTRIC SOLDERING IRON
Filed March 23, 1927
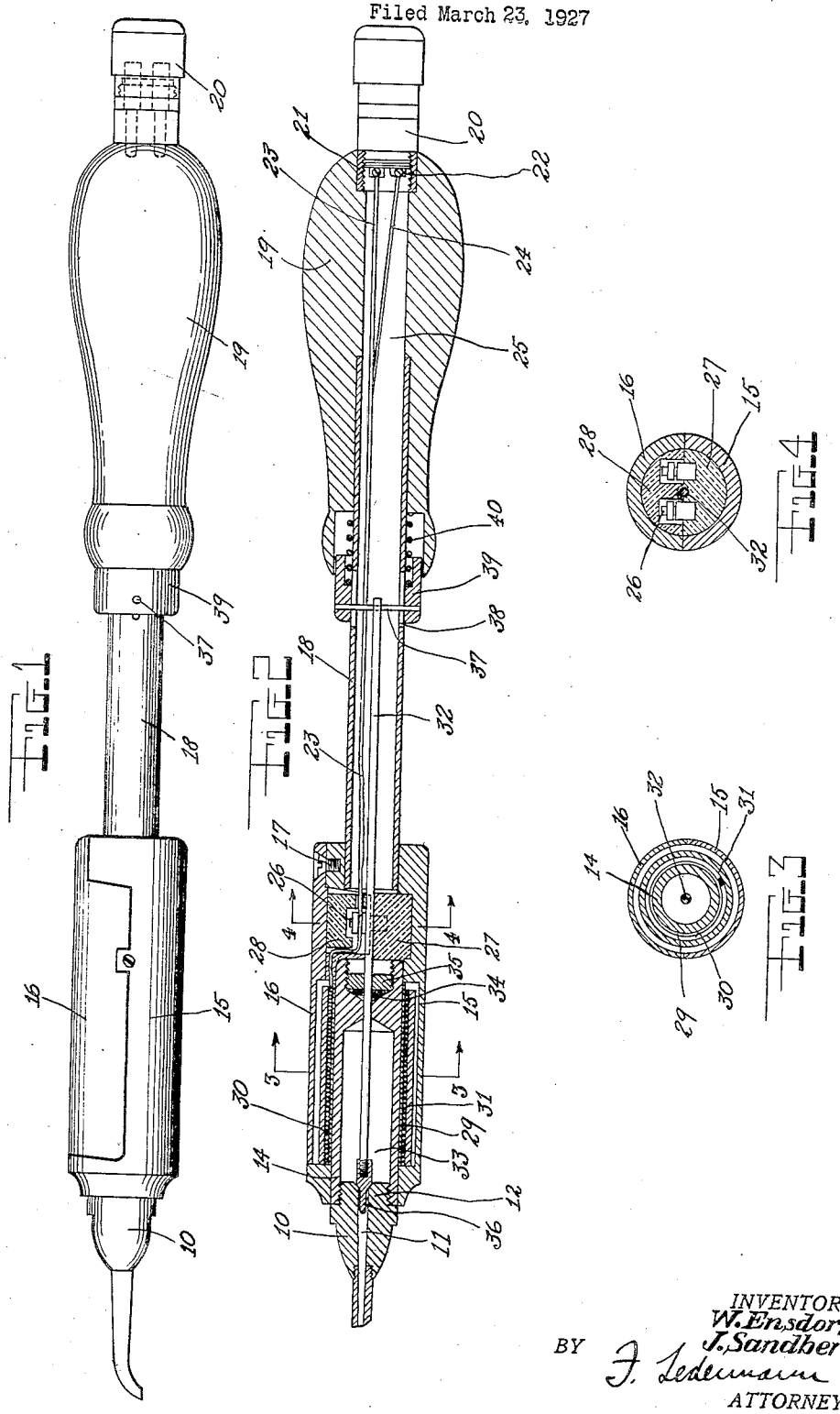
INVENTOR
W. Ensdorf
J. Sandberg
BY
ATTORNEY Patented Apr. 24, 1928.

1,667,250

UNITED STATES PATENT OFFICE.

WALTER ENSDORF, OF NEW YORK, N. Y., AND JOHANNES SANDBERG, OF ELIZABETH, NEW JERSEY.

ELECTRIC SOLDERING IRON.

Application filed March 23, 1927. Serial No. 177,528.

The main object of this invention is to provide a soldering iron which is adapted to be electrically heated for the purpose of keeping the solder contained in a reservoir in a fluid state.

Another object of the invention is to provide an electrically heated soldering iron which is provided with a cylinder which acts as a reservoir and is enveloped by a heating coil, the reservoir and the heating coil being removable for purposes of replacement.

Still another object of the invention is to provide a fountain soldering iron having a reservoir in which a plunger is provided for the purpose of closing access to the mouth of the soldering head.

The above and other objects will become apparent in the description below in which characters of reference refer to like-named parts in the drawing.

Referring in brief to the drawing, Figure 1 is a longitudinal side elevational view of the soldering iron.

Figure 2 is a longitudinal sectional side elevational view of the soldering iron.

Figure 3 is a cross sectional view taken thru the reservoir on line 3—3 of Figure 2.

Figure 4 is a cross sectional view taken on line 4—4 of Figure 2.

Referring in detail to the drawing, the numeral 10 indicates a soldering head which has a threaded extension 12 and a passageway 11 thru which the molten solder is fed to the mouth of the same, located at the extreme end thereof. The extension 12 is engaged to the open end of an annular reservoir 14. The reservoir is entirely housed within the shell which consists of two semi-cylindrical members 15 and 16. Member 15 serves as the body in which the parts of the soldering iron are contained and member 16 serves as a cover which is secured on the body by a screw 17. The body 15 has a tubular stem 18 secured in its one end and on the extreme end of the stem a handle 19 is mounted.

A detachable socket 20 is mounted in the end of the handle and threads into a sleeve 21, the socket and sleeve both being made of some insulating material. The socket has a pair of terminals 22 mounted therein which have lead wires 23 and 24 connected thereto. The lead wires extend thru a channel 25 in the handle and thru the stem 18 to its opposite end. Adjacent the end of the stem which is secured in the body 15 the wires exit from the stem and are connected to the binding posts 26 whose lower ends are embedded in a semi-circular block of insulating material 27. These binding posts are covered and protected by an additional semi-circular block of insulating material 28 which seats upon the block 27.

The heating element of the soldering iron consists of a sleeve of three layers of material, an inner sleeve of isinglass, a coil of resistance wire 30 wound helically about the sleeve 29, and an outer sleeve of asbestos 31 which latter envelopes the coil and serves to retain the heat or divert it toward the reservoir over which the sleeves are slipped when originally assembled or when replacement is desired. The ends of the coil 29 are connected to the binding posts 26 which are mounted on the block 27, and conduct the current from the plug to the heating coil of the soldering iron. A plunger 32 passes thru the stem 18 into the reservoir chamber 33 thru a stuffing box in which packing 34 retained in place by a screw cap 35, is housed. The end of the plunger which projects into the reservoir chamber has a threaded end which is engaged by a tip 36 which is of smaller dimensions than the passageway 13 and is slidable therein. The one end of the tip is enlarged and serves as a valve which closes the entrance to the passageway.

The plunger is normally extended to closed position where the valve seats upon the entrance to the passageway by a spring 40 which is coiled about the outer surface of the stem 18 and is concealed in a recess formed in the lower end of the handle. This spring engages a retractor ring 39 which latter is urged toward the soldering head. The ring has a pin 37 passing diametrically thru it. This pin passes thru slots 38 formed longitudinally in the stem and within the latter the pin is connected to the plunger 32.

The soldering head and iron is used in the conventional manner and no description of its use will be attempted. The soldering iron is so constructed as to permit the easy removal of any of its parts for purposes of replacement or the like. After the soldering head 10 has been unscrewed from place the tip 36 may be removed from the plunger 32 after which the reservoir 14 may be extended from the body 15 and removed. Then after removing the screw 17 the cover 16 may be lifted from place after which the block 28 may be lifted from place and the lead wires of the coil 29 secured to the binding posts may be detached from these posts and the entire coil removed for purposes of replacement or for any other reason desired. A portion of the socket 20 is made removable and the terminals of this slip socket is attached to lead wires which are connected to the line circuit not shown on the drawing. From the illustration it will be seen that a soldering iron is provided in which a valve is used, the valve normally closed to prevent the flow of solder and in which all the parts which may suffer injury may be easily removed and just as easily replaced as is desired.

It is to be noted that certain changes in form and construction may be made without departing from the spirit and scope of the invention.

We claim:

1. A device of the class described comprising a soldering head having a passageway therein, a cylindrical hollow body split into two sections, a semi-circular cover and an additional semi-circular member, a cylindrical removable reservoir in said body having the soldering head engaged therewith, a hollow stem extending from said body, a handle on said stem, removable blocks in said body having terminal posts thereon, a heating unit encircling said reservoir, a plunger in said stem and reservoir slidable therein, a packing in said reservoir, and a sleeve mounted slidably on said stem connected to said plunger for retracting the same.

2. A device of the class described comprising a soldering head having a passageway therein, a hollow semi-circular body, a semi-circular cover therefor, a hollow reservoir removable from said body having the soldering head secured thereto, a sleeve having an inner cylindrical insulating member, an intermediate coil of helically wound resistance wire and an outer cylindrical member of asbestos covering the coil, said sleeve enveloping the reservoir, removable insulating blocks in said body having terminal posts thereon, the coil being electrically connected to the terminal posts, a plunger slidable in said stem and reservoir, a sleeve slidable on said stem and connected to the plunger, a handle having a recess therein, a spring in said recess engaging the sleeve for normally extending the latter, and a plug socket mounted at the end of said handle.

In testimony whereof we affix our signatures.

WALTER ENSDORF.
JOHANNES SANDBERG.